UNITED STATES PATENT OFFICE.

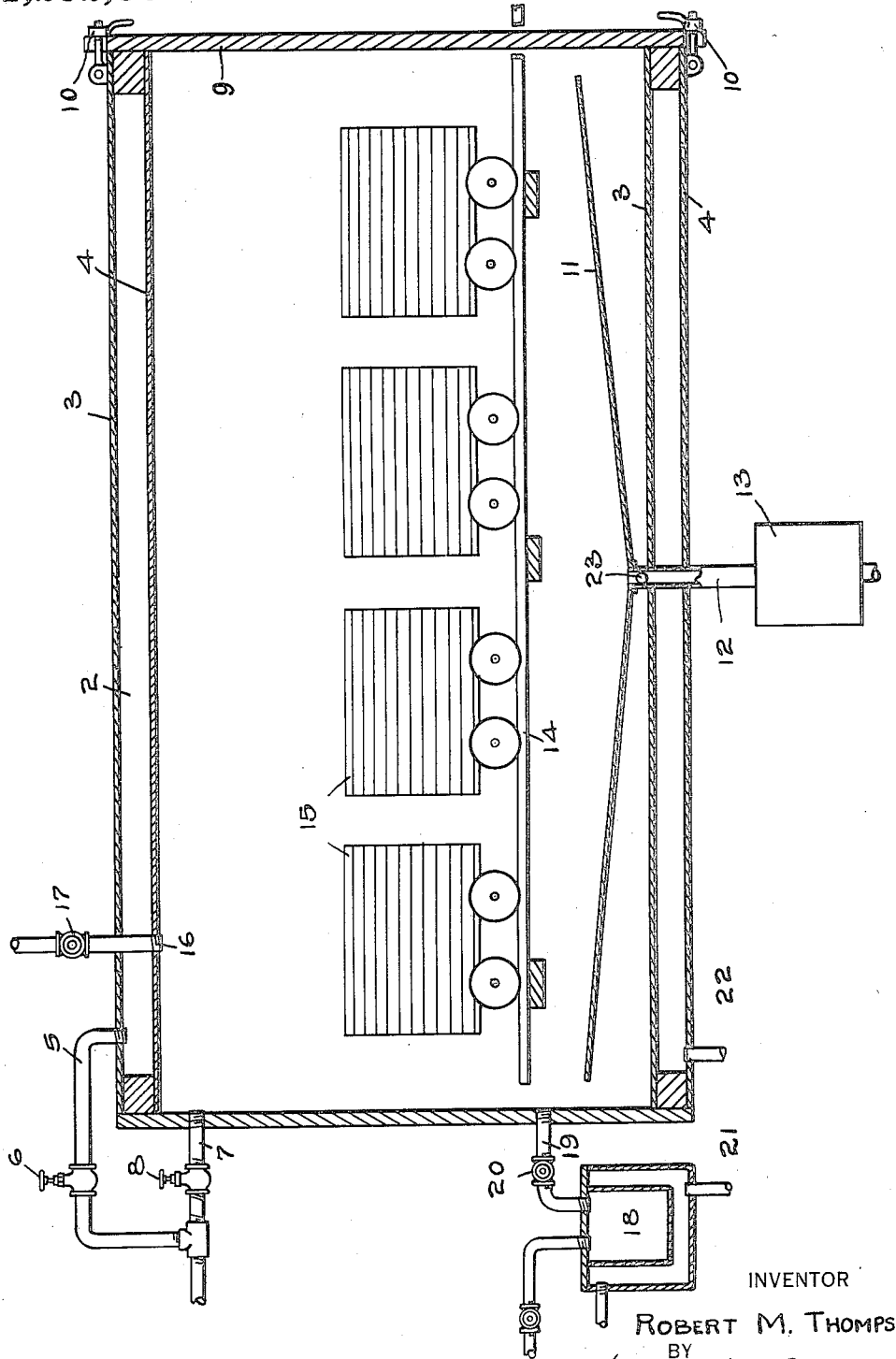

ROBERT M. THOMPSON, OF TACOMA, WASHINGTON.

PROCESS OF PRESERVING FISH AND PRODUCTS THEREOF.

1,252,865.  Specification of Letters Patent.  Patented Jan. 8, 1918.

Application filed November 26, 1917. Serial No. 204,009.

*To all whom it may concern:*

Be it known that I, ROBERT M. THOMPSON, a citizen of the United States, residing at Tacoma, in the county of Pierce and State of Washington, have invented a certain new and useful Improvement in the Processes of Preserving Fish and Products Thereof, of which the following is a specification.

My invention relates to improvements in the process of preserving of fish, or the like, more particularly to preserving the meat of such species or genera which belong to the shark family, and has as its object the preserving of such meat by altering the condition of the liquids and the meat from an alkaline to a neutral or acid reaction; or by overcoming free ammonia; or by the removal of the liquids which are of an alkaline reaction and the substitution therefor of liquids having a neutral or acid reaction; the flavoring of the liquids thus substituted so that the meat, otherwise distasteful, is rendered pleasing to the taste; and the providing of an apparatus adapted to apply such process.

In increasing the food supply by securing a greater yield from the sea, the attempt has been made to preserve the grayfish (commonly known as dog fish), but in preserving such fish by methods commonly employed in the preserving of fish such as salmon, ammonia or ammonia compounds are developed, which in time destroy the tin coating of the can and otherwise render the meat entirely unedible. The bone structure of the grayfish being cartilaginous does not cook up soft but, being protein rather than phosphatic chemically, becomes a soft, mushy, unappetizing mass. While I have described my invention in its application to grayfish, nevertheless, it is by no means to be considered as limited to such, but is applicable to all other meats wherein is produced, upon canning, ammonia compounds or liquids having an alkaline reaction.

In view of the character of the liquids present in grayfish after cooking, my process consists in so treating the meat that upon canning an alkaline reaction will not develop, but a neutral or acid reaction will result. Merely removing the free juices after or during cooking greatly lessens the destructive effectiveness of the alkaline condition of the liquids and meat. Kippering or smoking the meat attains the same end and contributes a new flavor. Thus, after the fish are cleaned, skinned and the meat part separated from the bone, the meat having been sufficiently heated to render the same readily separable, the liquids and the meat may be treated so that their condition chemically is changed from alkaline to a neutral or acid reaction. This result may be obtained by adding to each can of meat before sealing a sufficient amount of an acid, the amount varying with the strength thereof, or, as I prefer, the liquids present in the meat upon cooking, which are such as to produce an alkaline reaction, may be removed and other liquids of a neutral or acid nature substituted therefor. In removing the liquids present in the meat after cooking, two courses may be followed: First, the liquids may be forcibly ejected by centrifugal force and simultaneously the meat treated by a fluid of a neutral or acid reaction so that the process may be regarded as forcibly injecting the new liquid, which in turn "crowds out" the former liquids present after cooking; or, second, the air pressure in the retort containing the meat after or during cooking may be reduced by means of a vacuum pump so that the air pressure in the cellular structure of the meat will force out the liquids, which are then drained from the presence of the meat and thereupon the pressure in the retort may be raised by introducing fluid of a neutral or acid reaction. Manifestly, the pressure outside the cellular meat structure being greater than the internal pressure will cause the fluid to thoroughly impregnate the cells.

In following the first above-mentioned course of removing the liquids from the cooked meat, any standard centrifugal separator may be employed. While the meat which has been cooked is forcibly pressed against the outer revolving screens, ordinarily present in such separators, the neutral or acid fluid is sprayed against the said meat which, after being thoroughly saturated with the fluid thus introduced, may be used immediately or preserved for future use by reheating and canning.

In following the above-mentioned second course of removing the liquids from the cooked meat, I have constructed a new retort, which apparatus constitutes a part of my invention herein claimed. Referring to the drawings, the figure represents diagrammatically a longitudinal sectional view of a steam retort embodying my invention. The retort has a steam jacketed wall 2 in the space between the walls 3 and 4. Steam is supplied to the space 2 through pipe 5, which pipe has the valve 6 and steam is supplied to the retort chamber through the pipe 7, which has the valve 8. A door 9 is removably secured by means of the clamps 10. Within the retort a false bottom 11 is provided, sloping to a drain 12 provided with a steam trap 13. Above the false floor 11 is supported a track 14, which carries cars 15 with trays for fish. A vacuum pump is connected to the retort by means of the pipe 16, provided with a valve 17. In the receptacle 18, acid may be heated and the fumes conducted into the retort through the pipe 19, provided with the valve 20. Drains 21, 22 and 23, being supplied with valves, serve to drain their respective receptacles.

The operation of my apparatus will now be described, along with the processes to be followed in pursuing the above-mentioned second course of removing the liquids from the cooked meat. The retort is tightly closed with the dressed fish on the trays of the cars 15 and steam is admitted to the space 2 through the pipe 5 and to the retort chamber through the pipe 7. As the meat becomes thoroughly cooked, the undesired juices and the condensed steam will fall to the floor 11 and be drained off through the steam trap 13. When the cooking is completed, the steam to the retort chamber is cut off by means of the valve 8 and the air pressure in the retort chamber is reduced by means of the vacuum pump (a 24 inch vacuum will suffice). This permits the air in the cellular structure of the meat to eject the remaining liquids to a large extent, which are also drained off through the steam trap 13. After thus subjecting the meat to a vacuum, the pump is stopped and the valve 17 closed. Then the valve 20 is opened to let in the acid fumes from the acid receptacle 18. As the vacuum is thus decreased in the retort chamber, the acid fluid will thoroughly impregnate the meats as the pressure increases, since the cellular structure has had its air pressure reduced by being subjected to a vacuum, just described. Sufficient of the fluid is used to overcome the destructive effectiveness of the alkaline condition of the liquids and meat. Thereupon, a vacuum is again created which, together with the steam in the jacket (2), will evaporate and remove such portion of the moisture as may be desired, after which the fish may be removed from the drier, and the meat, after being separated from the bone, may be canned or otherwise used.

The meat of the grayfish is not in and of itself pleasing to the taste and, therefore, having prepared the meat for canning, as above explained, or during such process of treating the meat, the flavor of other meats and oils, such as that of salmon or the juices of crustacea such as shrimp, crab or lobster, may be added to the acid liquids above described, or lemon juice, or salad oils or dressings may be supplied.

Obviously, changes may be made in the above, the same only setting forth preferred forms of embodiment of my invention, without departing from the principle or the spirit thereof. The meats may be subjected to an acid bath before cooking, which will serve to alter the meat so as to destroy the destructive effectiveness of the alkaline condition of the meat or its liquids or gases.

I claim:

1. The process of preserving fish which consists in changing the chemical condition of the meat and juices from an alkaline to a neutral or acid reaction.

2. The process of preserving fish which consists in removing the liquids from the meat and replacing the same with liquids having a neutral or acid reaction.

3. The process of preserving fish which consists in removing a portion of the liquids from the meat and replacing the same with liquids having a neutral or acid reaction, which liquids have been flavored with the juices of other meats.

4. The process of preserving fish which consists in cooking the fish until the meat is easily separated from the bones, removing the bones and changing the chemical condition of the meat and juices from an alkaline to a neutral or acid reaction.

5. The process of preserving fish which consists in cooking the fish until the meat is easily separated from the bones, removing the bones and removing the liquids from the meat and replacing the same with liquids having a neutral or acid reaction.

6. The process of preserving fish which consists in cooking the fish until the meat is easily separated from the bones, removing the bones and removing the liquids from the meat and replacing the same with liquids having a neutral or acid reaction, said liquids having been flavored with the juices of other meats.

7. The process of preserving fish which consists in cleaning and skinning the fish, heating the meat to cause the same to freely leave the bone, separating the bone from the meat, removing the free juices, heating the meat and subjecting the same to an acid fluid so that the condition of the meat potentially ammoniated is altered to a neutral or acid reaction.

8. The process of preserving fish which consists in cleaning and skinning the fish, heating the meat to cause the same to freely leave the bone, separating the bone, removing the free juices, heating the meat and subjecting the same to an acid fluid so that the condition of the meat potentially ammoniated is altered to a neutral or acid reaction and said fluid being combined with the juice of other meats and seasonings to lend a pleasant flavor to the meat.

9. The process of preserving the meat of the shark family by overcoming the free ammonia normally present by acidulating the meat to the point of destroying the distasteful effectiveness of the alkaline condition of the meat.

10. The process of preserving the meat of the shark family by removing the free juices to such point that the effectiveness of the alkaline condition of the meat is overcome.

11. The article of manufacture comprising the meat of the shark family changed from an alkaline condition to a neutral or acid reaction, said meat being flavored with the flavors of other meats.

12. The article of manufacture comprising the meat of grayfish changed from an alkaline condition to a neutral or acid reaction, said meat being flavored with salad dressings.

13. As an article of manufacture, a metal can containing a normally alkaline sea food acidulated to prevent reaction between the said food and the can.

14. The article of manufacture comprising the meat of grayfish and the oils and juices of salmon.

15. The article of manufacture comprising the meat of the shark family flavored with the flavors of other meats.

16. The article of manufacture comprising the kippered meat of the shark family flavored with salad oils.

17. The process of treating fish of the shark family which consists in changing the chemical condition of the meat from an alkaline to a neutral or acid condition.

18. The process of treating fish of the shark family and the like consisting in neutralizing or acidulating the alkaline meat by a non-poisonous acid.

19. The process of treating fish of the shark family and the like to overcome the free ammonia therein, consisting in neutralizing or acidulating the alkaline meat by a non-poisonous vegetable acid.

20. The process of treating fish of the shark family to prevent breaking down of the texture thereof when canned, consisting in removing part of the moisture from the fish before final sealing in the cans.

21. The process of treating fish of the shark family which consists in removing part of the moisture from the meat, changing the chemical condition of the meat from an alkaline to a neutral or acid condition, and then canning same.

22. The process of preserving fish of the shark family for human food, consisting in changing the chemical condition of the meat from an alkaline to a neutral or acid condition, canning such meat and cooking same.

23. The process of preserving fish of the shark family and the like for human food to overcome the free ammonia therein, consisting in neutralizing or acidulating the alkaline meat by a non-poisonous vegetable acid, canning such meat, and cooking same.

24. The process of preserving fish of the shark family for human food, consisting in removing part of the moisture from the fish before final sealing in the cans to prevent breaking down of the texture thereof when canned, canning such meat, and cooking same.

25. The process of preserving fish of the shark family for human food, consisting in treating such fish with an acid to arrest the breaking up of the nitrogenous compounds therein into alkaline derivatives, canning such treated fish; and cooking same.

26. The process of preserving fish which consists in cooking fish in a retort, removing the exuded juices of the fish, producing a partial vacuum within the retort, introducing an acidic fluid into the retort and impregnating the meat therewith, then subjecting the contents of the retort to a partial vacuum to remove a portion of the moisture, and finally canning the meat.

27. The process of preserving fish of the shark family which consists in cooking fish in a retort, removing the exuded juices of the fish, producing a partial vacuum within the retort, thoroughly draining the meat, introducing acidic fluid into the retort and impregnating the meat with the said fluid, shutting off the supply of the acidic fluid and again subjecting the contents to a partial vacuum to remove a portion of the moisture, then separating the meat from the bone, and finally canning the meat.

28. An article of manufacture comprising meat of the shark family neutralized or acidulated.

29. An article of manufacture comprising meat of the shark family neutralized or acidulated and smoked.

In witness whereof, I hereunto subscribe my name this 20th day of November, A. D. 1917.

ROBERT M. THOMPSON.